United States Patent [19]

Stanley

[11] 4,193,951

[45] Mar. 18, 1980

[54] WATER AERATING DEVICE

[76] Inventor: Carl F. Stanley, Rte. 1, Box 123B, Zimmermann, Minn. 55398

[21] Appl. No.: 935,605

[22] Filed: Aug. 21, 1978

Related U.S. Application Data

[63] Continuation of Ser. No. 824,259, Aug. 15, 1977, abandoned, which is a continuation of Ser. No. 668,326, Mar. 18, 1976, abandoned.

[51] Int. Cl.² .............................................. C02C 5/04
[52] U.S. Cl. .................................... 261/91; 261/120; 210/242 A
[58] Field of Search ................. 261/91, 120, DIG. 71; 210/242 A, 219, 220; 416/185; 415/213 R

[56] References Cited

U.S. PATENT DOCUMENTS

| | | | |
|---|---|---|---|
| 2,350,939 | 6/1944 | Sprouse | 416/185 |
| 2,433,592 | 12/1947 | Booth | 261/93 |
| 3,086,715 | 4/1963 | Mineau et al. | 239/568 |
| 3,218,042 | 11/1965 | Ciabattari et al. | 210/242 A |
| 3,778,978 | 12/1973 | Matsushita | 261/120 |
| 3,796,414 | 3/1974 | Winton | 261/91 |
| 3,911,065 | 10/1975 | Martin et al. | 261/91 |
| 3,980,740 | 9/1976 | Bos | 261/91 |

FOREIGN PATENT DOCUMENTS 6918698  6/1971  Netherlands .............. 261/91

*Primary Examiner*—Frank W. Lutter
*Assistant Examiner*—Gregory N. Clements
*Attorney, Agent, or Firm*—James E. Nilles

[57] ABSTRACT

A device for floating on a body of water such as a lake or a pond and which draws up water and aerates it and then dumps the aerated water back on the body of water. More specifically, the device includes an impeller for pumping the water upwardly against a rotatable beater which in turn sucks in air and mixes the water and air thoroughly, forces it against a deflecting baffle and the baffle in turn then directs the mixture downwardly onto the body of water. The beater includes a generally horizontally disposed plate having paddles at its underside and having air scoops on its upper side and which functions to thoroughly aerate the water and direct it against the baffle.

4 Claims, 6 Drawing Figures

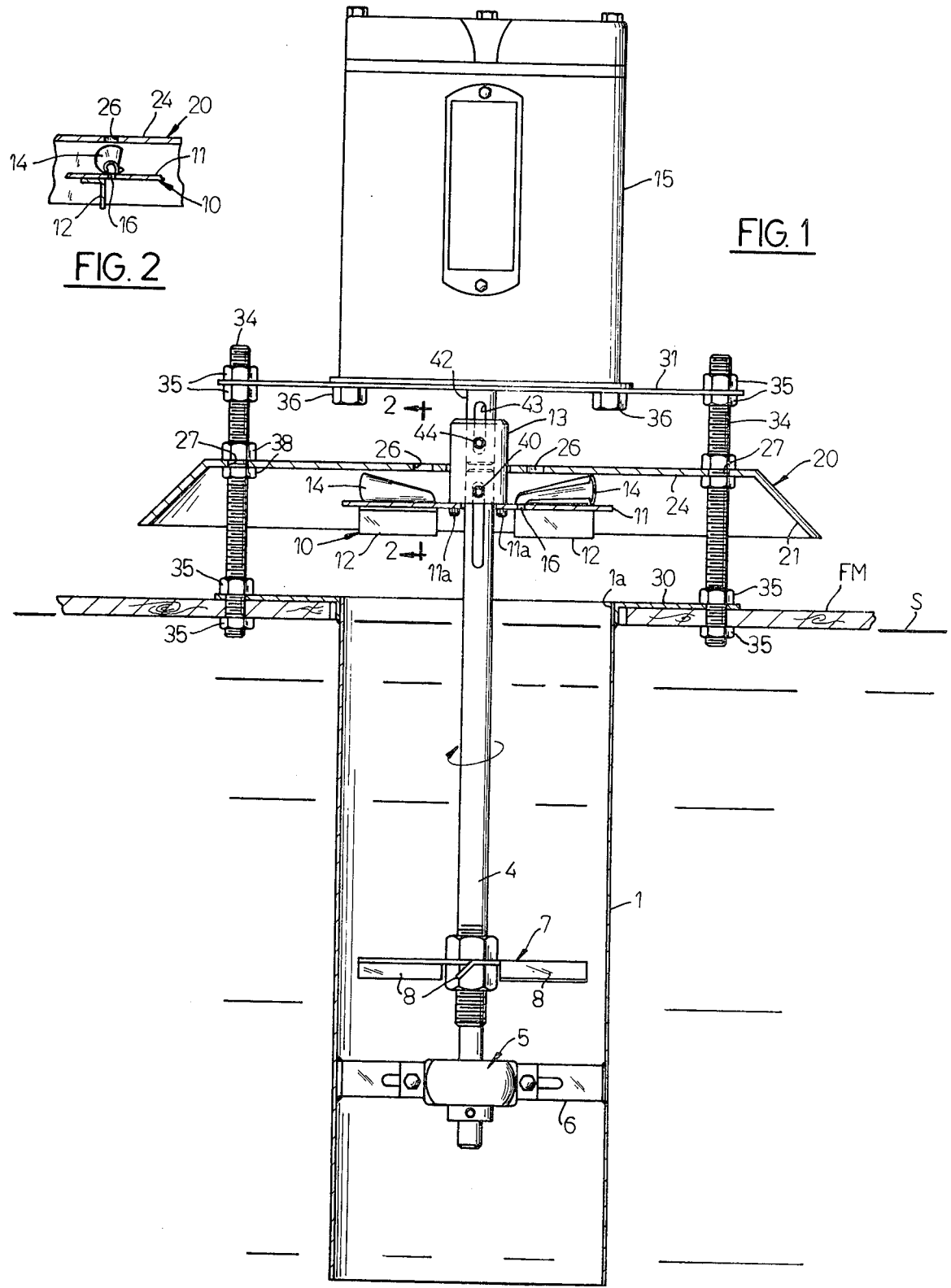

WATER AERATING DEVICE

REFERENCE TO RELATED CO-PENDING APPLICATIONS

This is a continuation of application Ser. No. 824,259, filed Aug. 15, 1977, which application is a continuation of application Ser. No. 668,326, filed Mar. 18, 1976, both of which are abandoned.

BACKGROUND OF THE INVENTION

Various devices of this general type have been proposed for aerating a body of water and have been used with some degree of success. These prior art devices have had certain shortcomings, however, such as the inability to sufficiently aerate the water due to the fact that the water was not thoroughly agitated, or due to the fact that sufficient air was not provided for being entrained in the water. Another shortcoming of certain prior art devices was the fact that the water was not handled continuously or as a body but rather was dispersed or atomized to a point where the individual particles of water cooled to a point where freezing thereof occurred; this shortcoming occurs particularly in cold climates where the device is located in an open hole in an otherwise frozen body of water, and care must be exercised so that the water being aerated does not, in itself, freeze.

SUMMARY OF THE INVENTION

The present invention provides an aerating device for a body of water and which device includes a downwardly extending generally tubular water inlet member in which is journalled a drive shaft having a water pumping impeller at its lower end. The upper end of the water inlet member extends above the water level and has a beater attached for rotation thereby. The beater in turn has a series of paddles at its underside for receiving the water from the discharge end of the tubular member, and which beater has a series of curved air scoops on its upper surface for drawing air in through a downwardly facing baffle and directing it to the paddle, whereby the arrangement being such that the beater acts to thoroughly mix the water and air and then force it against the downwardly facing baffle. The baffle then directs the water downwardly and over a floatation means which supports the device and then onto the surface of the body of water. With the arrangement of the present invention, the water is agitated or mixed with oxygen many times before being returned to the body of water and the mixture is prevented from being chilled by the cold air, i.e., that is from mixing too much with the air which would otherwise result in freezing of the water particles. Stated otherwise, the particular beater or spinner and baffle plate combination acts to take in air and water and move it in more or less of a solid motion so that the air will not chill to cause freezing and build-up of a frozen mixture.

With the device of the present invention, the water is lifted from the body of water to the agitating beater where air is directed by scoop-like blades and mixed with the water, the water also acting to suck in the air into the agitating blades and then the mixture is thrown against the baffle plate from which it is driven downwardly against the float means for subsequent return to the surface of the body of water.

These and other objects and advantages of the present invention will appear hereinafter as this disclosure progresses reference being had to the accompanying drawings.

BRIEF DESCRIPTION OF THE DRAWINGS

FIG. 1 is a vertical elevational view of an aerating device made in accordance with the present invention, certain parts being shown as broken away or in section for clarity of the drawings;

FIG. 2 is a cross-sectional view taken generally along the line 2—2 of FIG. 1;

DESCRIPTION OF THE PREFERRED EMBODIMENT

Figure 3:
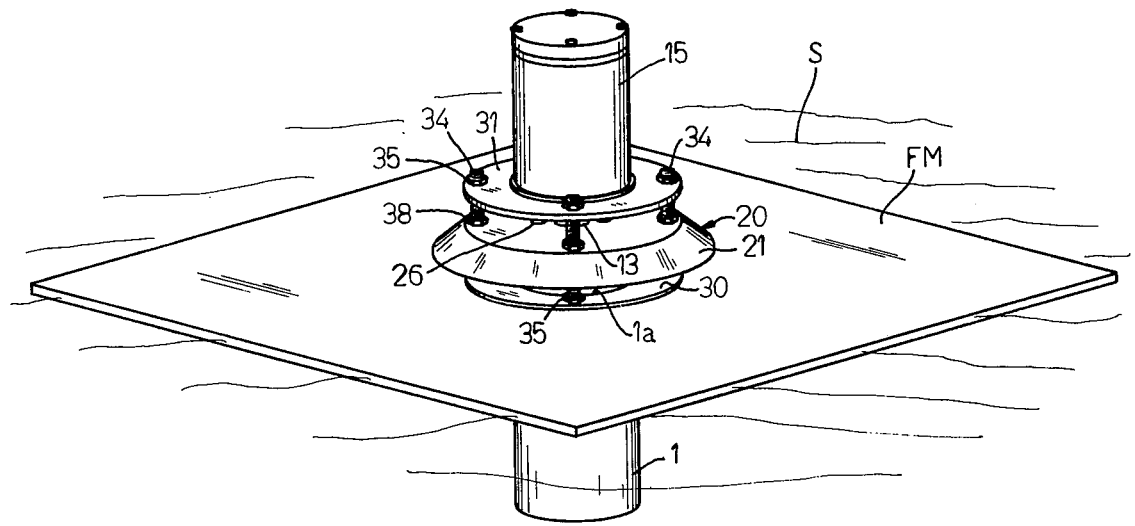
FIG. 3 is a perspective view of the device shown in FIG. 1, but on a smaller scale.
Figure 4:
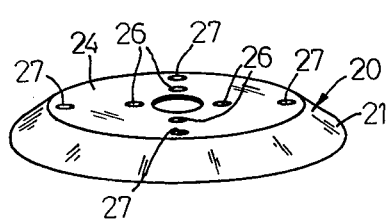
FIG. 4 is a perspective view of the baffle shown in FIG. 1.

The aerating device provided by the present invention is adapted to float on a body of water by a floatation means FM, the latter of which can take any suitable form and which floats on the surface S of the body of water. The device provided by the present invention acts to lift water, causing any poisonous gases to be released therefrom and the water is thoroughly mixed with air by being caused to change its direction and being thrown against various surfaces several times in its return to the surface of the water.

More specifically, the aerating device provided by the present invention includes a downwardly extending and generally tubular, water inlet member 1 which can be of any suitable length so as to extend downwardly through the water to the desired extent. The upper end 1a of the inlet member is located above the surface S of the water and the open upper end of the member acts as a discharge opening for the water. A rotatable power shaft 4 extends centrally within the inlet member and is journalled therein by means of a suitable anti-friction bearing assembly 5 which is held in position by bracket means 6 that is secured to the inner wall of member 1. Adjacent the lower end of the shaft 4 is an impeller 7 which has a series of circumferentially spaced, angularly disposed blades 8, the angularity of which acts to lift the water upwardly through the intake member and discharge it from the discharge opening.

Figure 5:
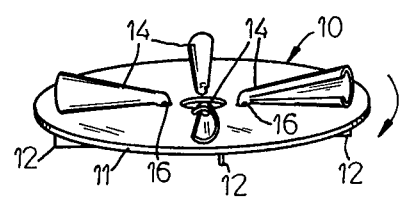
FIG. 5 is a perspective view of the beater shown in FIG. 1.
Figure 6:
FIG. 6 is a perspective view of the impeller shown in FIG. 1.

At the upper end of the shaft 4 is mounted a beater 10 that comprises a generally horizontally disposed plate 11 which is secured by cap bolts 11a to a collar 13. A plurality of circumferentially spaced paddles 12 are secured to the underside of plate 11. The paddles are formed, for example, by angle iron members. Air scoop members 14 are circumferentially spaced around and secured to the upper side of the plate 11 and are curved as shown in FIG. 5 in a direction of blade rotation. These scoops also taper slightly toward their radially inner end where they communicate with holes 16 in plate 11. The scoops then act to collect and direct the air through plate 11 and discharge the air at the radially inner end of paddles 12 (FIG. 1).

The power source 15, such as, for example, an electric motor which is fully enclosed, is secured to the upper end of shaft 4 for driving the latter.

A dish-shaped baffle 20 is secured, as will be described, directly above the beater 10 and has a downwardly facing annular flange 21 which is inclined outwardly and downwardly. The baffle also has an upper generally horizontal top wall 24 in which are formed a series of air inlet openings 26. Mounting holes 27 are also provided in the top wall 24.

Means are provided for rigidly securing the baffle 20 and the power source 15 to the upper end of the water inlet member 1. More specifically, this means includes a pair of vertically spaced brackets 30 and 31 which are generally horizontally disposed and are connected together by the threaded studs 34 and suitable nuts 35. The lower bracket 30 is rigidly secured as by welding, for example, to the upper end of the water inlet member 1, and the power source 15 is rigidly secured by bolt means 36 extending through bracket 31 and threadably engaged into the housing of the power source. The baffle 20 is secured by suitable nuts 38, one being located on either side of the top wall 24. The upper end of the shaft 4 is slideably but not rotatably mounted to collar 13 by a set screw 40 which extends into a slot 41 in the shaft 4. The shaft 42 of the motor also has a slot 43 into which a set screw 44 in collar 13 extends. Thus, the beater can be adjusted on shaft 4 and the slot and pin connections provide easy assembly and disassembly of the unit.

In operation, the shaft is rotatably dirven by the power source 15 and the impeller blades 8 act to lift the water through the inlet member 1 and discharge it upwardly against the beater 10. The beater in turn acts to agitate the water and mix it with air, some of which is drawn through the openings 26 in the baffle means by the air scoops 14. The mixture of air and water is then forceably directed against the downwardly facing baffle 20 and is thus driven against the floatation means FM and ultimately drops onto the water surface.

During the operation, the water is caused to be forceably driven against various surfaces and at different directions and is thoroughly aerated but is not sufficiently atomized to permit it being frozen, as for example, when used in extremely cold climates. Instead, full flow of the water prevents air chill and at the same time good aeration is provided.

I claim:

1. A water aerating device for bodies of water, such as lakes, ponds or the like, said device comprising floatation means located on the surface of the water and having an upper surface of predetermined diameter, a water inlet member for extending downwardly into the water to be aerated, and supported on said floatation means, said water inlet member having a water discharge opening which is bounded by said upper surface of said floatation means, a rotatable shaft mounted in said water inlet member and having a water pump impeller secured thereto, said impeller acting to pump water upwardly through said water inlet member and discharging it upwardly through said discharge opening, a rotatable water and air beater secured to said shaft and located above said discharge opening, said beater having air scoop means on its upper side and water paddles on its lower side and against which water is discharged from said opening by said impeller, a baffle of a diameter less than said predetermined diameter located above said beater and including a downwardly and inwardly facing annular flange which is located above said upper surface of said floatation means and extends downwardly around said beater to enclose the periphery of said beater, said baffle having at least one air inlet opening therethrough located above said beater and inwardly of said annular flange, said beater laterally directing a mixture of air and water forceably against said downwardly and inwardly facing flange for downward direction by said flange against said upper surface of said floatation means, a power source connected to said shaft and above said baffle, and means for rigidly securing said baffle, said power source, and said water intake member on said floatation means, whereby air and the water being discharged from the water inlet member are thoroughly mixed, directed against said baffle, then directed downwardly against said upper surface of said floatation means and from thence to the body of water.

2. The device set forth in claim 1 further characterized in that said impeller has a plurality of inclined paddle members thereon for lifting water through said inlet member.

3. The device set forth in claim 2 further characterized in that said air scoop means on said beater includes a plurality of air scoops secured to said beater, which air scoops each have a curved surface facing in the direction of beater rotation for drawing air into said baffle through said air inlet opening for being mixed with the water.

4. The device set forth in claim 1 further characterized in that said air scoop means on said beater includes a plurality of air scoops secured to said beater, which air scoops each have a curved surface facing in the direction of beater rotation for drawing air into said baffle through said air inlet opening for being mixed with the water.

* * * * *